United States Patent
Cobb et al.

(10) Patent No.: US 12,032,075 B2
(45) Date of Patent: Jul. 9, 2024

(54) SATELLITE-BASED SOURCE OF POSITIONING SYSTEM-INDEPENDENT POSITION NAVIGATION AND TIME

(71) Applicant: Satelles, Inc., Reston, VA (US)

(72) Inventors: H. Stewart Cobb, Reston, VA (US); Mark Hargrove, Vienna Santa Clara, VA (US); Jerry Goetsch, Reston, VA (US); Gregory Gutt, Herndon, VA (US); Dan Higgins, Reston, VA (US); Pete Johnson, Reston, VA (US); Trevor Landon, Vienna, VA (US); David G. Lawrence, Santa Clara, CA (US); Michael L. O'Connor, Redwood City, CA (US); Mark Pedersen, Reston, VA (US); Rachel Schmalzried, San Jose, CA (US); Francois Tremblay, Reston, VA (US)

(73) Assignee: Satelles, Inc., Reston, VA (US)

( * ) Notice: Subject to any disclaimer, the term of this patent is extended or adjusted under 35 U.S.C. 154(b) by 29 days.

(21) Appl. No.: 17/557,716

(22) Filed: Dec. 21, 2021

(65) Prior Publication Data
US 2023/0194727 A1    Jun. 22, 2023

(51) Int. Cl.
*G01S 19/40* (2010.01)
*G01S 19/07* (2010.01)
*G01S 19/38* (2010.01)

(52) U.S. Cl.
CPC ............. *G01S 19/40* (2013.01); *G01S 19/07* (2013.01); *G01S 19/073* (2019.08); *G01S 19/38* (2013.01)

(58) Field of Classification Search
CPC .......... G01S 19/07; G01S 19/40; G01S 19/38; G01S 19/073
USPC ....................................... 342/357.23, 357.21
See application file for complete search history.

(56) References Cited

U.S. PATENT DOCUMENTS

| | | | |
|---|---|---|---|
| 5,828,336 A | 10/1998 | Yunck et al. | |
| 9,612,334 B2* | 4/2017 | Gutt | G01S 19/40 |
| 11,280,911 B2* | 3/2022 | Kennedy | G01S 19/30 |
| 11,445,373 B1* | 9/2022 | O'Connor | H04L 9/3247 |
| 11,640,002 B2* | 5/2023 | Reid | G01S 19/10 |
| | | | 342/357.395 |

(Continued)

OTHER PUBLICATIONS

International Search Report and Written Opinion for App. PCT/US2022/052551 mailed Jun. 16, 2023.

(Continued)

*Primary Examiner* — Chuong P Nguyen
(74) *Attorney, Agent, or Firm* — Lempia Summerfield Katz LLC

(57) ABSTRACT

For global navigation satellite system (GNSS)-independent operation of auxiliary PNT systems, one or more ground stations of the auxiliary system have access to a non-GNSS source of precision timing. That source and known locations of the ground stations may be used to derive timing corrections to account for imperfect clocks in the satellites for non-purpose-built satellite systems being used for PNT. Crosslinks between satellites and/or propagation of timing correction through other ground stations are used to better control the timing and resulting precession of PNT in the PNT auxiliary system. The timing correction may be provided as a service to end users, other constellations, and/or other satellite operators.

26 Claims, 6 Drawing Sheets

(56) References Cited

U.S. PATENT DOCUMENTS

| | | | |
|---|---|---|---|
| 11,668,834 B2* | 6/2023 | Reid | B64G 1/242 |
| | | | 342/357.395 |
| 2012/0176271 A1 | 7/2012 | Dai et al. | |
| 2015/0316655 A1 | 11/2015 | Robinson et al. | |
| 2016/0011318 A1 | 1/2016 | Cohen | |
| 2016/0033649 A1 | 2/2016 | Mathews et al. | |
| 2016/0282470 A1 | 9/2016 | Mcdonald et al. | |
| 2018/0376393 A1 | 12/2018 | Wu et al. | |
| 2019/0257952 A1 | 8/2019 | Zhou et al. | |
| 2020/0379118 A1 | 12/2020 | Reid et al. | |
| 2021/0286089 A1* | 9/2021 | Dai | G01S 19/04 |
| 2021/0311197 A1 | 10/2021 | Noble et al. | |
| 2022/0075079 A1* | 3/2022 | Kassas | G01S 19/393 |
| 2022/0386126 A1* | 12/2022 | O'Connor | H04W 12/06 |
| 2023/0204792 A1* | 6/2023 | Lawrence | G01S 19/25 |
| | | | 342/357.42 |

OTHER PUBLICATIONS

EUSPA "What is SBAS?" Updated May 17, 2021. pp. 1-5.https://www.euspa.europa.eu/european-space/eu-space-programme/what-sbas.

Kendall Russell. "FAA Tasks Intelsat with Navigation Satellite WAAS Payload" Apr. 2018. Embedded Avionics. pp. 1-5.

Loh, Robert, and Gemot MR Winkler. "UTC Time Reference from WAAS in Real Time." Proceedings of the 9th International Technical Meeting of the Satellite Division of The Institute of Navigation (ION GPS 1996). 1996. pp. abstract.

NIST "Two Way Time Transfer." Retrieved Dec. 20, 2021. pp. 1-3. https://tf.nist.gov/time/twoway.htm.

Satelles, Inc. "How it Works: STL leverages LEO satellite infrastructure to broadcast signals that enable precision time and frequency measurements, thereby functioning as an incredibly reliable source of alternative PNT." Retrieved Dec. 20, 2021. pp. 1-2.https://satelles.com/technology/satellite-time-and-location-stl/how-stl-works/.

W. J. Klepczynski, "The role of time and frequency in the wide Area Augmentation System (WAAWS)," Proceedings of the 1998 IEEE International Frequency Control Symposium (Cat. No.98CH36165), 1998, pp. abstract, doi: 10.1109/FREQ.1998.717910.

Wikipedia "BeiDou" https://en.wikipedia.org/wiki/BeiDou Retrieved Dec. 20, 2021. pp. 1-9.

Wikipedia "Galileo (satellite navigation)" Retrieved Dec. 20, 2021. pp. 1-30. https://en.wikipedia.org/wiki/Galileo_(satellite_navigation).

Wikipedia "Global Positioning System" Retrieved Dec. 20, 2021. pp. 1-39. https://en.wikipedia.org/wiki/Global_Positioning_System.

Wikipedia "GLONASS" Retrieved Dec. 20, 2021. pp. 1-27. https://en.wikipedia.org/wiki/GLONASS.

Wikipedia "GNSS augmentation" Retrieved Dec. 20, 2021. pp. 1-5. https://en.wikipedia.org/wiki/GNSS_augmentation#Satellite-based_augmentation_system.

Wikipedia "GRACE and GRACE-FO" Retrieved Dec. 20, 2021. pp. 1-13. https://en.wikipedia.org/wiki/GRACE_and_GRACE-FO.

Wikipedia "Transit (satellite)" Retrieved Dec. 20, 2021. pp. 1-9. https://en.wikipedia.org/wiki/Transit_(satellite).

* cited by examiner

SATELLITE-BASED SOURCE OF POSITIONING SYSTEM-INDEPENDENT POSITION NAVIGATION AND TIME

BACKGROUND

The present embodiments relate to satellite-based positioning and/or timing. Global Navigation Satellite Systems (GNSS), like Global Positioning System (GPS), provide position, navigation, and timing. GNSS systems themselves are purposely built to be a primary source of position, navigation, and time (PNT). GPS has satellites stationed in Medium Earth Orbit with onboard atomic clocks, allowing the GPS satellites to operate autonomously for extended periods of time. Society is becoming increasingly reliant on GNSS, like GPS, for timing and/or positioning. This dependence on GPS includes critical infrastructure, safety of life services, commercial applications, and national security applications. If there is a GPS outage of any significant duration, great disruption to the infrastructure may occur (e.g., a billion dollars a day of economic value).

Auxiliary systems may provide PNT. Industry examples of auxiliary systems include Satelles, NextNav, and IEEE-1588 systems. These type of auxiliary PNT systems rely on imperfect clocks and are prone to biases/error sources. These auxiliary systems currently use GPS timing to control these biases and errors. Without GPS to provide precise timing, the auxiliary system may not operate well. If GPS becomes unavailable, these current auxiliary satellite-based systems will eventually fail because these current auxiliary systems rely in one way or another on GPS.

SUMMARY

By way of introduction, the preferred embodiments described below include methods, computer readable storage media, and systems for GNSS independent operation of auxiliary PNT systems. One or more ground stations of the auxiliary system have access to a non-GNSS source of precision timing. That source and known locations of the ground stations may be used to derive timing corrections to account for imperfect clocks in the satellites for non-purpose-built satellite systems being used for PNT. Crosslinks between satellites and/or propagation of timing correction through other ground stations are used to better control the timing and resulting precession of PNT in the PNT auxiliary system. The timing correction may be provided as a service to end users, other constellations, and/or other satellite operators.

In a first aspect, a satellite system includes two or more satellites configured to transmit PNT signals independent of a GPS or any other purpose-built PNT system. The two or more satellites are linked such that a relative range and/or satellite timing is provided between the two or more satellites. The two or more satellites each have a clock. At least one ground monitoring station has a known location and is configured to receive the PNT signals of at least one of the two or more satellites. A terrestrial source of precision timing is independent of GPS or any other purpose-built PNT system. A processor is configured to estimate, for each of the two or more satellites, a variation between the clock of the satellite and the precision timing source using the observations from the at least one ground monitoring station and the relative range and/or satellite timing.

In a second aspect, a method is provided for determining timing corrections for satellites independent of a purpose-built PNT system. A first receiver receives PNT signals from satellites. The PNT signals are based on respective clocks of the satellites. Corrections for the clocks of the satellites are determined based on the PNT signals, a source of precision timing, and a link between the satellites.

In a third aspect, a satellite system includes first and second satellites configured to transmit PNT signals independent of a global positioning system or any other purpose-built PNT system. The first and second satellites have first and second clocks, respectively. First and second ground monitoring stations have known first and second locations, respectively. The first ground monitoring station is operable to receive the PNT signals of the first satellite and not the second satellite. A terrestrial source of precision timing is available to at least the first ground monitoring station. A first processor is configured to estimate a first variation between the first clock of the first satellite and the precision timing. The first variation is based on the precision timing, the first location, and the PNT signals. A second processor is configured to estimate a second variation between the second clock of the second satellite and the precision timing. The second variation is based on propagation of (1) the first variation communicated to the second ground monitoring station and the PNT signals of both satellites or (2) an indication of correction of the first clock based on the first variation.

In a fourth aspect, a satellite system is provided. A first satellite of a first constellation is configured to transmit position, navigation, and time (PNT) signals independent of a global positioning system or any other purpose-built PNT system. The first satellite has a first clock. A second satellite of a second constellation different than the first constellation is configured to transmit PNT signals. The second satellite has a second clock. First and second receivers have known first and second locations, respectively. The first receiver is operable to receive the PNT signals of the first satellite and not the second satellite. A terrestrial source of precision timing is available to the first receiver. A first processor is configured to estimate a first variation between the first clock of the first satellite and the precision timing. The first variation is based on the precision timing, the first location, and the PNT signals. A second processor is configured to estimate a second variation between the second clock of the second satellite of the second constellation and the precision timing. The second variation is based on information from the first constellation based on the first variation.

In a fifth aspect, a method is provided for providing PNT data independent of GPS or other purpose-built PNT systems. Variations of each satellite's position and/or internal timing for a group of satellites is determined using inter-satellite links. Signals from one or more of said satellites are compared to a terrestrial timing reference at a known location. Based on the comparing, a difference between (a) the variations of the satellite positions and/or internal timing and (b) actual earth-referenced positions based on the known location and/or the terrestrial timing reference is estimated. The estimates are communicated to an end-user receiver of the PNT data.

In a sixth aspect, a satellite system includes two or more satellites configured to transmit PNT signals independent of GPS or any other purpose-built PNT system. The two or more satellites are linked such that a relative range and/or satellite timing is provided between the two or more satellites. The two or more satellites each have an internal clock. A terrestrial source of precision timing is independent of the global positioning system or any other purpose-built PNT system. At least one ground station has a known location and is configured to transmit signals to at least one of the two or more satellites, where the timing of the transmitted signals is synchronized with the said precision timing. The satellite receiving the said signals is configured to measure the timing of the received signals with respect to the first internal clock. The satellite is further configured to compute the variations of the first internal clock relative to the terrestrial source of precision timing, taking into account the motions of the satellite relative to the known location of the ground station. The satellite is further configured to synchronize the first internal clock with the terrestrial source or measure and distribute the variations of the first internal clock of the precision timing to at least the second satellite using the link.

The present invention is defined by the following claims, and nothing in this section should be taken as a limitation on those claims. Any one or more features discussed herein may be used alone or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 5 is a block diagram of one embodiment of a satellite system for timing correction through propagation instead of crosslinks; and.

DETAILED DESCRIPTION OF THE DRAWINGS AND THE PRESENTLY PREFERRED EMBODIMENTS

Continuously available, satellite-based source of GPS/GNSS-independent PNT is provided. The PNT is completely independent of GPS or other purpose-built PNT systems. For example, the timing from GPS is not used. A precise master clock is used as a timing reference for the system instead of relying on GPS as the precise time reference. Accurate time synchronization and time transfer is performed using satellite crosslinks, propagating from a precise time source through the system, and ultimately providing performance improvements to the system end users.

In one embodiment, a GPS independent, self-contained LEO system enhances the satellite time and location (STL) technology by linking a system of distributed receivers (e.g., user receivers, ground monitoring stations, ground stations, base stations, ground command stations, or distributed sensor nodes) to a precise timing source, such as the US standards for time and/or frequency. The linking provides a correction that can be applied to the PNT system either through the ground infrastructure and retransmitted through to a satellite as part of the data sent to the receiver or via corrections directly being transmitted from ground infrastructure to the user equipment.

Figure 1:
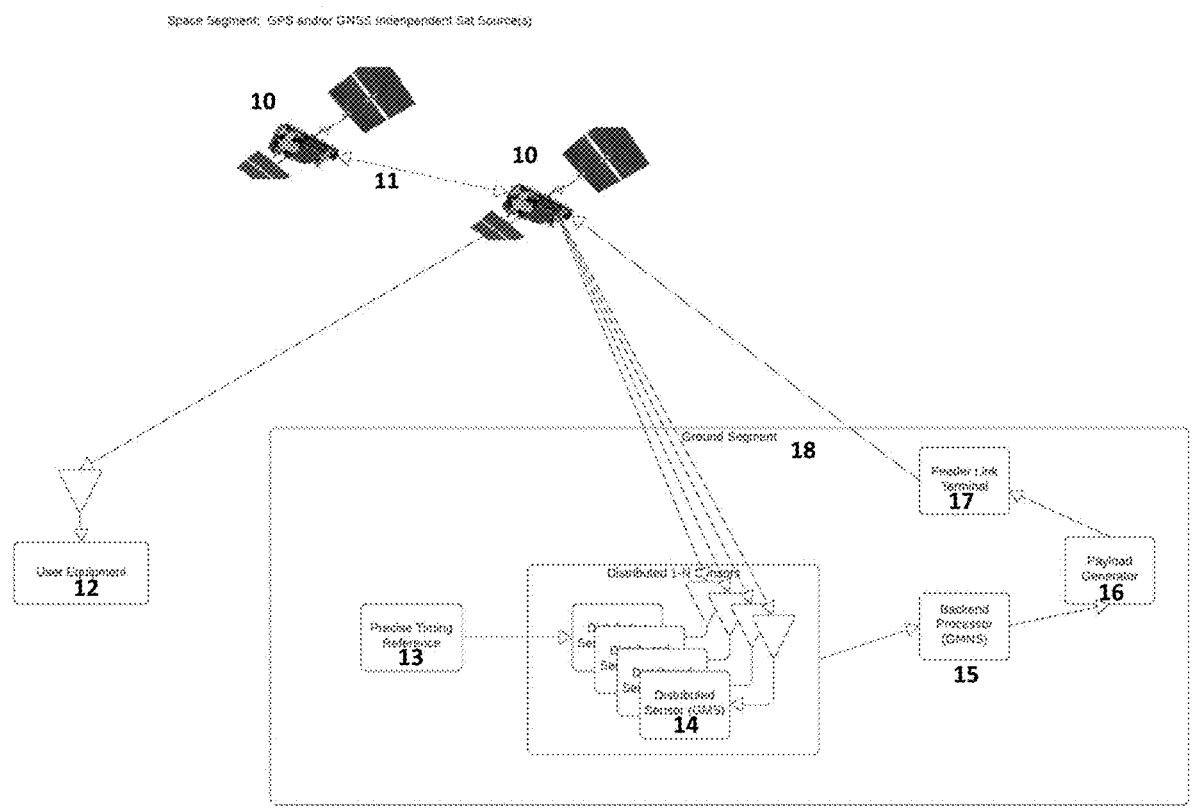
FIG. 1 illustrates one embodiment of a satellite system for providing PNT data independent of GNSS based on crosslinks.

FIG. 1 shows one embodiment of a satellite system. This satellite system leverages crosslinks 11 and a precision timing source 13. The precision timing source 13 and crosslinks 11 help to ensure independence from GPS or other purpose-built PNT systems. Other purpose-built PNT systems are any system used for both timing and navigation or positioning. This auxiliary satellite system provides PNT without relying on GPS so is a complimentary and/or fallback system from GPS.

The satellite system includes a space segment (e.g., satellites 10 with crosslinks 11), a ground segment 18 (e.g., source 13 of precision timing, ground monitoring stations 14, processor 15, generator 16, and feeder link terminal 17 (e.g., ground station or ground command station), and a user segment (e.g., user equipment 12). Additional, different, or fewer components may be provided. For example, the processor 15 and payload generator 16 may be one device. As another example, other ground segments 18, such as those associated with multiple constellations, may be provided. In yet another example, additional user equipment 12 is provided.

Two or more satellites 10 are provided. FIG. 1 shows two satellites for simplicity, but tens, hundreds, thousands, or millions of satellites 10 may be provided. The satellites 10 are configured to transmit signals usable for PNT independent of the GPS or other purpose-built PNT system. The satellites 10 may be used for other purposes than PNT, such as for telephony or computer network communications. Purpose-built PNT systems, such as GPS and other GNSS, provide PNT. GNSS is designed for global PNT inclusive of constellations such as GPS, GLONASS, Galileo, and/or Beidou. GNSS satellites are typically in mid-earth orbits (MEO). BeiDou/Compass and others, such as the regional Quasi-Zenith Satellite System (QZSS), Indian Regional Navigation Satellite System (IRNSS) include at least some satellites in other orbits.

The satellites 10 of the auxiliary PNT system are in any orbit. In one embodiment, the satellites are in low earth orbit (LEO). For example, the satellites 10 are Iridium satellites. Purpose-built GNSS systems tend to use MEO to avoid complications or inaccuracies due to atmospheric drag, earth gravitational effects, and of lesser likelihood of collisions and mitigation maneuvers. LEO satellites deal with drag modeling. At the altitude of LEO, drag modeling is more important than at geosynchronous earth orbit (GEO) because there is a lot more atmosphere and the speed is faster (about 1.9× as fast). Drag is proportional to atmospheric density and speed squared. Drag may be several orders of magnitude less at MEO. As with drag modeling, geopotential modeling is also more important in LEO than MEO as geopotential modeling ties to the calculation of the effects of Earth's gravitational field. A system in LEO orbit may have to complete conjunction mitigation maneuvers from time to time. This may be more important as LEO becomes more densely populated. The satellite system using LEO satellites includes drag modeling, geopotential modeling, and accounts for maneuvering to provide PNT signals.

In one embodiment, all the satellites 10 of a constellation are in a same orbital region, such as LEO. In other embodiments, one or more of the satellites 10 are in a different orbital region, such as one satellite 10 being LEO and another being MEO or GEO. The satellites 10 in different orbital ranges may be in the same or different constellations. 1-N, where N is a positive integer, additional satellites in some or all various orbital possibilities (LEO, MEO, GEO, Polar, and so forth) may be provided.

The satellites 10 are part of a same constellation. The satellites 10 are operated in conjunction with each other and managed by the same entity. For example, the Iridium constellation is used. In other embodiments, the different satellites 10 are part of different satellite constellations. The satellites 10 within the system may come from one or more constellations or individual satellite deployments and are used in a multi-constellation framework for an enhanced multi-constellation system. These could include numerous multi-satellite constellation and/or multiple satellite orbital constellations. For example, this could include a variety of arrangements including Iridium plus other constellations such as: Kuiper, OneWeb, SpaceX, and/or Small/Cube/Micro/SpaceBEEs, etc. Other combinations of constellations may be used, such as SpaceX, and SpaceBEEs.

The satellites 10 are wireless signal transmitters. The different satellites 10 have a same or different structure. The satellites 10 include a reference oscillator and other internal clock circuits.

The satellites 10 broadcast or directionally transmit PNT signals. The satellites 10 are configured by software, firmware, and/or hardware to transmit the signals to each other and/or to the receivers 12, 14, 21.

The satellites 10 are linked such that a relative range and/or satellite timing is provided between the two or more satellites 10. The link may be through communications, such as bi-directional communications. In one embodiment, the link is a measurement. One satellite 10 measures signal or receives PNT information from the other satellite 10. Any one satellite 10 may be able to observe (e.g., receive signal and/or measure) any number of other satellites 10. Laser ranging or other measurement may form the crosslink. The crosslink is between satellites and is bi-directional or uni-directional with or without communications.

The crosslink 11 between satellites 10 is not limited by orbital region. Information may be passed between any of the inter-satellites 10 through transmittal and reception. In other embodiments, the crosslink 11 is observational only without communication of data. Occultation of astronomical objects or signals from other satellites, such as satellites in different orbits (for example GEO satellites) may be used.

The crosslink 11 allows for determination of relative satellite timing. The clock difference (e.g., phase difference) between clocks of different pairs of satellites 10 may be measured from PNT signals transmitted by one and received by the other satellite 10. Alternatively, or additionally, the crosslink 11 is an inter-satellite link between the satellites 10 capable of measuring a pseudorange between satellites 10. The PNT signals, laser range finding, or other ranging are used to determine the pseudorange, including the relative timing.

The ground monitoring stations 14 are base stations having receivers for receiving PNT signals from one or more of the satellites 10. Each ground monitoring station 14 may receive PNT signals from multiple satellites 10, such as all satellites in a region above or in view of the ground monitoring station 14. Different ground monitoring stations 14 may be in different regions for receiving from different satellites 10 at different times. In other embodiments, multiple ground monitoring stations 14 receive PNT signals from the same satellite at the same time for redundancy. One or more ground monitoring stations 14 may receive signals from satellites 10 of only a single constellation or may receive signals from satellites 10, 20 of multiple constellations.

Any number of ground monitoring stations 14 may be used, such as one or more. The ground monitoring stations 14 are capable of measuring or estimating satellite orbits based on the PNT radio signals received from the satellites 10.

The ground monitoring stations 14 have known locations. The location on earth of the receiving antenna is known. This known location is used with the PNT signals to determine the orbit of the satellite 10.

One or more of the ground monitoring stations 14 are configured to receive precision timing from the source 13. Less than all or all the ground monitoring stations 14 receive the precision timing on an input for timing or synchronization.

The ground monitoring stations 14 are configured to estimate an orbit of each satellite 10 for which PNT signals are received. Using known orbital information and a pseudorange estimated from the PNT signals, the orbit of the satellite is determined. The difference in the known location and location based on the pseudorange may indicate a timing difference between the satellite 10 and the clock or timing of the ground monitoring station 14.

The source 13 of the precision timing is a primary timing standard not derived from GPS or other satellite PNT systems. Timing source 13 is assumed to be the most accurate timing source available to any of the ground monitoring stations 14. For example, the source 13 may be a worldwide standard of timing, a national standard of timing, a military standard of timing, or a corporate standard of timing. Example national standards of timing include timing from the National Institute of Standards and Technology (NIST) or from the United States Naval Observatory (USNO). Other current or future standards for timing may be used. In one embodiment, the source 13 is an atomic clock.

FIG. 1 shows an embodiment using one source 13. If one timing reference is used, and a correction is available, such as in the case of NIST (e.g., a time correction may be available relative to the standard from USNO), the correction or delta to the precision timing may be used to improve the system. Two or more sources 13 (i.e., two master clocks) may be used. These standards or sources 13 may be used collectively as a timing reference for the system. The system may combine the timing information from these multiple sources 13 in the way beneficial to its operation (such as to improve accuracy, support failover, etc.), including without limitation averaging, selecting, prioritizing, weighting, or monitoring of the information.

The precision timing source 13 is independent of the GPS, GNSS, or any other purpose-built PNT system. Instead of relying on GPS for system time, the precise timing references or sources 13 (e.g., ground clocks) may be used to remove system reliance and support a system's operation in cases where GPS or GNSS is no longer available or reliable.

The processor 15 is a processor of the ground monitoring station 14, such as a ground monitoring network server (GMNS), which may be co-located with one or multiple of the ground monitoring stations 14. The processor 15 may be a server, a computer, or another processor for extracting information, determining orbits, and determining timing corrections. For example, the processor 15 is a backend processor or signal processor, such as a field programmable gate array, application specific integrated circuit, multi-thread processor, signal processor, general processor, graphics processing unit, correlation processor, digital circuit, analog circuit, combinations thereof, or another device. In other embodiments, the processor 15 is a computer network or distributed arrangement of processors.

The processor 15 is configured to receive data from the master clock (i.e., precision timing from the source 13), the ground monitoring stations 14, and the satellites (e.g., information from the inter-satellite links 11 received via the ground monitoring stations 14). PNT range estimation, timing estimation, and/or determining timing or location difference may be performed by the processor 15. The processor 15 uses that data to calculate orbits and clock offsets for the satellites 10. The processor 15 may be configured to estimate an orbit of each satellite 10 of the two or more satellites 10 for determining the clock offsets.

For each satellite 10, the processor 15 estimates a variation between the clock of the satellite 10 and the precision timing source 13 using the observations from the at least one ground monitoring station 14 and the relative range and/or satellite timing from the crosslinks 11. The data is used to calculate orbits and new satellite clock bias/offsets for the satellites 10. The relative range and/or satellite timing from the crosslinks 11 and the observations from the ground monitoring station 14 are incorporated to estimate the variation of the clock of each of the satellites 10. Alternatively, the processor 15 estimates the variation for one satellite 10, and then applies that variation to biases or offsets referenced to that one satellite 10 for other satellites 10. The processor 15 may estimate for one satellite and communicate to that one satellite 10, which then estimates for other satellites 10 and/or propagates the offset to other satellites 10 for local offset estimation.

In one embodiment, the relative offsets for the clocks between satellites 10 is known from the crosslinks. The offsets may be with respect to a clock of a ground monitoring station 14 or a reference satellite 10. To ground or tie the offsets to an accurate clock, the source 13 of precision timing is provided. The offset of the reference relative to the precision timing is determined, allowing timing corrections to be based on the offset of the reference and the relative offsets to the reference. Timing corrections are provided for all the satellites 10 relative to the precision timing. Timing may be provided for the constellation (e.g., $T_{Iridium}$) as the reference. Each satellite 10 has a timing bias ($T_{bias}$) as a correction for the satellite specific clock to the timing for the constellation (i.e., satellite timing is $T_{Iridium}+T_{bias}$ for that satellite). $T_{bias}$ may be determined using the crosslinks 11. By anchoring the $T_{Iridium}$ to the precision timing by the processor 15, then the satellite-specific timing corrections are determined. The processor 15 uses the PNT signals from the satellite to solve for the correction from $T_{Iridium}$. The timing corrections are performed by adjusting the clock directly or by transmitting data about the errors in the unadjusted clock.

In another embodiment, the timing for the precision timing is known. The range of the satellites in known orbits to the known location is known and measured. The difference in the measured range using the precision timing from the known range indicates the timing offset for that satellite 10. Each satellite 10 has its own bias, so crosslinks 11 may be used to provide the relative timings to find satellite-specific timing corrections.

In yet another embodiment, the precision timing from the ground station 14 is used to calibrate the clocks in the satellites 10. The orbit and thus distance of the satellite 10 is known. The satellite 10 bursts in arbitrary time. The time at the satellite, Tsv, plus the range from the satellite 10 to the ground station 14 divided by the speed of light plus the (not yet known) $T_{bias}$ for the satellite 10 equals the precision timing. The ground station 14 receives the pulse from the satellite and notes the time against the precise time standard. The time bias is then calculated for the satellite 10. The time biases for different satellites 10 are compared continually by measurements via the crosslinks 11, providing relative biases. The satellite-specific biases are determined using $T_{bias}$ and the relative bias. In other embodiments, a system of algebraic equations given the precision timing, measured range, known range, and timing biases from the crosslinks 11 may be used to solve for satellite-specific timing corrections. The ranges from the crosslinks 11 may be used instead of timing to derive the timing correction based on the precision timing.

The crosslink signals are transmitted at a known time relative to the onboard clock on the transmitting satellite 10 and are received at a time measured relative to the clock on the receiving satellite 10. The range between the two satellites 10 can be calculated onboard either satellite 10 from the time needed for a signal to make a round trip between the two satellites 10 (taking into account known delays at either end during the round trip) or by other ranging measurement. The variation between the two satellite clocks can be calculated for a crosslink signal by subtracting the one-way range from the difference between the known transmit time and the measured receive time. The variations in range over time between the two satellites 10 can be used to calculate their relative orbital motions.

The timing corrections are found for all the satellites 10 of a constellation. The constellation is linked to the precision timing without use of GPS or other purpose-built PNT system, allowing use of less accurate clocks than atomic clocks on constellation satellites used for non-PNT purposes (e.g., telephony or computer network communications) as well as PNT purposes. Timing corrections may be provided for only a subset of the satellites 10 of the constellation, such as for a region of coverage.

Figure 2A:
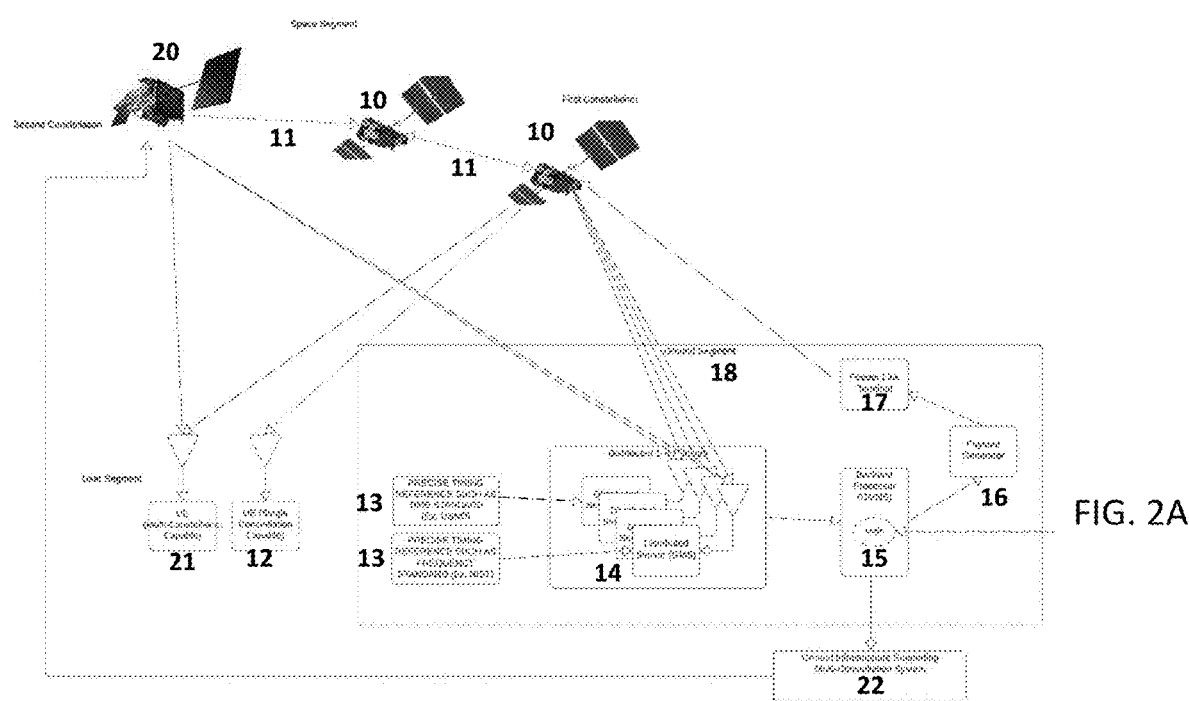
FIG. 2A illustrates another embodiment of a satellite system for providing PNT data independent of GNSS based on crosslinks with multiple constellations.
Figure 2B:
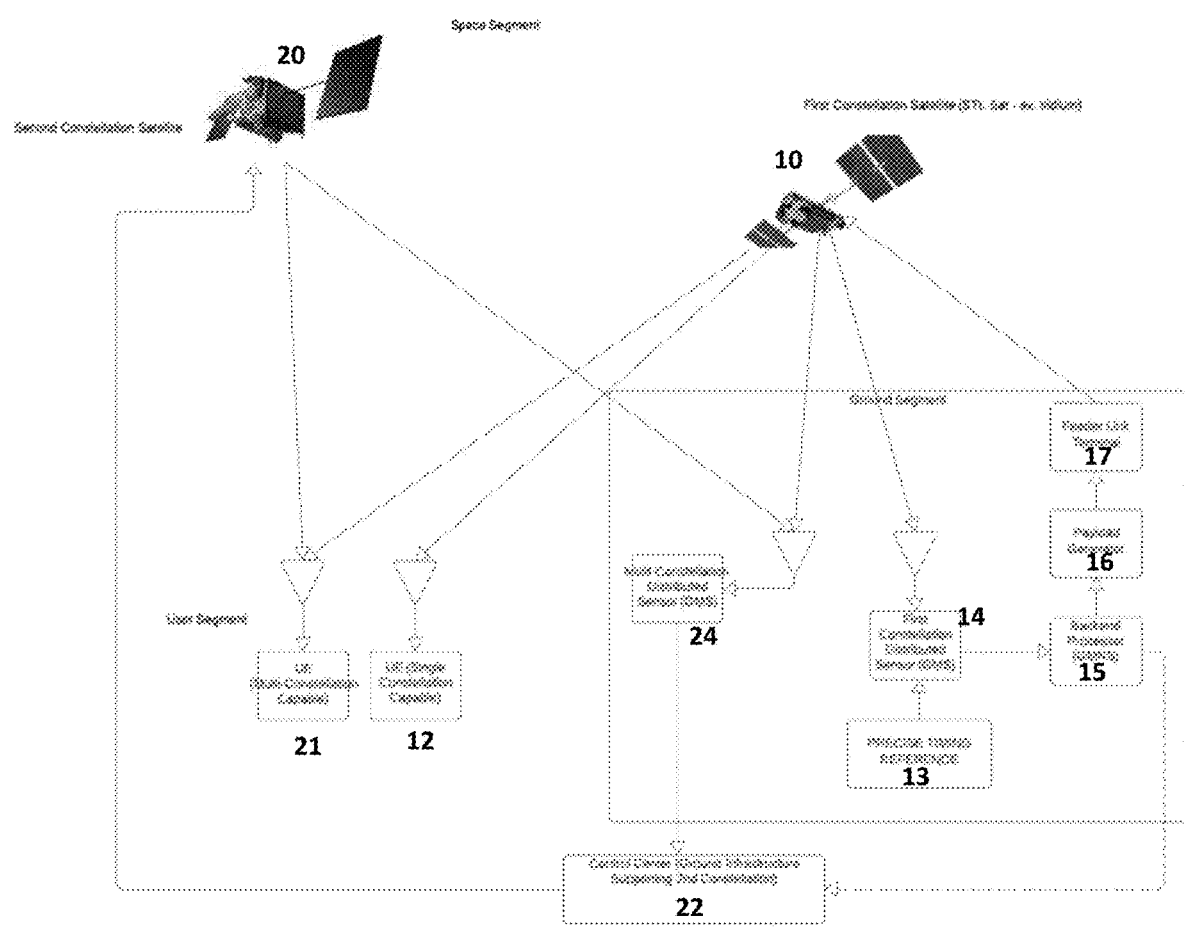
FIG. 2B illustrates another embodiment of a satellite system providing PNT data independent of GNSS with multiple constellations.

In other embodiments, the timing from one constellation is used to correct timing in another constellation. Timing information from one satellite constellation is used in another satellite constellation. FIGS. 2A and 2B show examples. The timing information from one or more satellites 10 of the one constellation is used for timing correction for timing of one or more satellites 20 of a different constellation. The crosslink 11 between satellites 10, 20 of different constellations provides relative timing and/or positioning. Once the timing correction of the satellite 10 in the one constellation is known based on the precision timing, the relative timing or position from the crosslink 11 may be used to determine the timing correction for the satellite 20 of the other constellation. In other embodiments (see FIG. 2B), the crosslink 11 is not used, such as by propagating the corrections from satellites 10 of one constellation to satellites 20 of another constellation via the ground segment.

In a multi-constellation system, two or more constellations or individual satellite deployments are provided. One or more constellations may be a single satellite, such as using timing corrections tied to precision timing source 13 other than GPS or Iridium to determine a correction for a single satellite, such as a weather satellite. The timing correction(s) for one constellation are used in a multi-constellation framework for an enhanced multi-constellation system to determine timing corrections for crosslinked (e.g., observable) satellites 20. These could include numerous multi-satellite constellations and/or multiple satellite orbital constellations.

In one embodiment, the timing correction is provided between constellations as a correction service. In a correction service, the system includes satellites 10, 20 from one or more constellations or individual satellite deployments at least one of which is not used for the service. For example, the satellites 10 of one constellation are used to provide the service to the satellites 20 of another constellation. The other constellation may include logic or upgrades to receive and use the correction, either through the crosslink 11 or through ground infrastructure 22 of the other constellation based on timing provided by the processor 15. The correction may be provided to the entity(ies) managing the PNT system or satellites 20 of the other constellation such that the correction can be applied through their network to satellites 20 and/or user equipment 21.

In one embodiment (see FIG. 2A), additional hardware and/or software at the distributed sensors of the ground stations 14 is configured to receive signals from more than one satellite 20 and/or constellation. In another embodiment (see FIG. 2B), a separate ground station 24 receives signals from the satellites 10, 20 of the different constellations. The timing correction may be provided as a service without requiring timing corrections for the constellation of satellites 10. The link to precision timing with or without the crosslink 11 information are used to determine the timing corrections as a service for the satellite 20. The processor 15 may use knowledge of the satellite clocks and orbits of the satellite 20 provided by the ground infrastructure 22 supporting the other constellation. In an alternate embodiment, the other ground infrastructure 22 is used to calculate the timing correction based on precision timing provided by the source 13. The processor 15 receives the data from any of various ground stations 14 for either of the constellations. Interfaces and corresponding hardware and/or software are used to communicate the data.

Referring to FIGS. 1 and 2A, 2B, the timing corrections are provided to the payload generator 16. The payload generator 16 determines the coding and other content of signals to be sent to the satellites 10. The payload generator 16 includes the timing corrections, whether destined for the satellite to use or for communication to the end user equipment 12, 21. The determined orbits may be included by the payload generator 16.

The transmitter 17 is an uplink facility or antenna and electronics for sending signals to the satellites 10. The transmitter 17 is configured to transmit the timing correction (i.e., variation in timing) for the clocks of the satellites 10 or for a clock of a reference satellite 10. The timing correction is destined for use by the satellites 10 for application to the timing at the satellite 10 and/or is destined for re-transmission to the end user equipment 12, 21 for use in correcting time and/or position determined by the end user equipment 12, 21 from PNT signals from the satellites 10. For example, the timing correction data is transmitted to the satellites 10 to be included in the PNT signal transmitted to the end user equipment 12, 21. The time bias, referenced to the precision timing, for each satellite 10 is transmitted in the message. For other constellations, a transmitter of the ground infrastructure 22 of that other constellation may transmit the calculated data to apply the new clock correction in the navigation (PNT) message. Time (e.g., timing corrections) is transferred throughout the constellation or constellations by the transmitter 17 having the satellites in view. A satellite 10 in view may be used to transfer the timing information to other ground stations 14 for propagation to other satellites 10 not in view of the transmitter 17. The crosslinks 11, where capable of satellite-to-satellite communication, may propagate the timing corrections.

The user equipment 12 are devices that use PNT information to determine timing and/or location, such as navigation devices. The user equipment 12 may include an antenna, oscillator, phased-lock-loop circuit, field programmable gate array, application specific integrated circuit, multi-thread processor, signal processor, general processor, graphics processing unit, correlation processor, digital circuit, analog circuit, combinations thereof, or other device for receiving wireless signals. One or more processors correlate or perform other operations on the received signals. The timing corrections received with the PNT signals may be used to correct timing in determining the position and/or time.

The user equipment 21 may be configured to receive wireless signals from multiple communications networks, such as the multiple constellations. Different antennas, frequencies of operation, and/or formats are used to receive the signals from the different satellites 10, 20. PNT signals from the satellites 10, 20 of different constellations may be used to determine time and/or position. Timing corrections received with the signals for the satellites 10, 20 used in position or time determination are used so that the time and/or position is more accurate. Alternatively, the timing correction is applied by the satellites 10, 20 so that the PNT signals are transmitted with more accurate timing.

Figure 3:
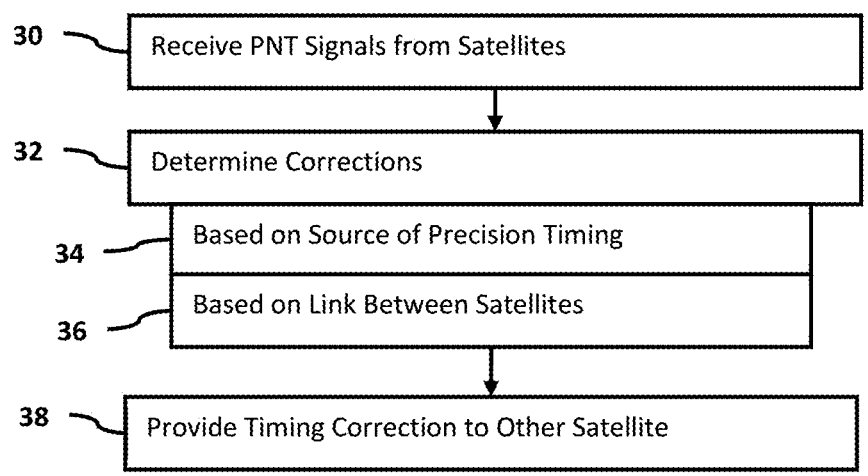
FIG. 3 is a flow chart diagram of one embodiment of a method for providing PNT data independent of GNSS.

FIG. 3 is a flow chart diagram of one embodiment of a method for determining timing corrections for satellites independent of any purpose-built PNT system. Timing corrections are provided for satellites used for both PNT and other uses. Rather than rely on GPS or other purpose-built PNT system for grounding the timing, another source of timing is used.

The method is implemented by a ground infrastructure of FIG. 1, FIG. 2A, FIG. 2B, or other ground infrastructure. For example, ground stations receive the PNT signals, including information from crosslinks. A processor determines the timing corrections, and the processor or a transmitter provides the timing corrections to satellites. Other arrangements may be used.

The acts are performed in the order shown or another order. Additional, different, or fewer acts may be provided. For example, acts for making observations on crosslinks, transmitting relative timing or position, receiving timing corrections at a satellite, and/or broadcasting the timing corrections in PNT signals are included. As another example, act 38 is not included, and/or an act for transmitting the timing corrections to the satellites of a same constellation and/or end-user equipment is included.

In act 30, one or more ground stations receive PNT signals from one or more satellites. The satellites are part of the same constellation but may be in different constellations. The PNT signals are based on or use timing from clocks of the respective satellites. The clocks may not be synchronized.

In addition to PNT signals, information from links between satellites is also received. The information may be relative timing and/or positioning between satellites.

In act 32, a processor determines corrections for the clocks of the satellites based on the PNT signals, a source of precision timing 34, and the link between the satellites 36. The timing correction for a clock of one satellite is determined from the PNT signals of that satellite and the source of precision timing 34. The timing correction for other satellites may be determined from, in part, the data from satellite-to-satellite links.

For the link information, the relative range and/or timing measured directly between satellites is provided. By communicating this link information to the receiver, the processor may use the relative timing and/or position to determine the timing correction. The precision timing 34 is a reference from which the corrections are formed. The precision timing 34 is from a source separate from any PNT system (e.g., GPS) so that outage of the PNT system does not result in loss of the precision timing.

In another embodiment, the link 36 is used for propagating timing. Due to limited fields of view or unavailability of crosslinks, the timing may be propagated through the constellation or between constellations. Indirect propagation is provided. The timing from different combinations of ground stations (e.g., receivers) and satellites is used. For example, the timing correction based on precision timing 34 available for one or a set of ground stations is used in determining timing correction for one or more satellites. These timing corrections are propagated to other ground stations via the satellites. The other ground stations may not have precision timing 34, so the corrections are used to find timing corrections for those ground stations. Satellites not in view of the ground stations with precision timing may then receive timing corrections from the ground stations without direct precision timing but anchored to the precision timing by the propagated timing correction for the ground station. This repeats across the constellation so that timing corrections are provided to satellites through uplink/downlinks to regions without precision timing. Alternatively, the timing is passed between ground stations (see FIG. 5).

In act 38, the processor provides one or more timing corrections for clocks of one or more satellite based on the PNT signals of the satellites. Timing correction for the clock of another satellite, such as in a different constellation, is used to provide the timing correction for the clock of the satellite. The timing correction may be provided through ground infrastructure or through satellite crosslinks.

In at least one embodiment, the system is a correction service for a second satellite operator and/or their users. In this example, the system includes satellites from one or more constellations where at least some constellations are not directly used for the enhanced service to determine the timing corrections. Instead, the constellation linked to the precision timing source includes communications and processing to gather the PNT signals and any crosslink information (e.g., observations between satellites) to provide a correction as a service for a satellite of a different constellation. The correction is provided to the other entity managing the secondary PNT system, such that the correction can be applied through their network to satellites and/or user equipment. For example, with use of ground monitoring stations and crosslinks for timing correction in Iridium, PNT signals are received from Starlink satellites as well. The Iridium-based system determines timing corrections for Starlink satellites using the precision timing and provides the Starlink satellite system with a correction or corrections. This correction service may use at least one connection between ground infrastructures where the correction is sent for that constellation provider to use the correction as deemed appropriate.

Figure 4:
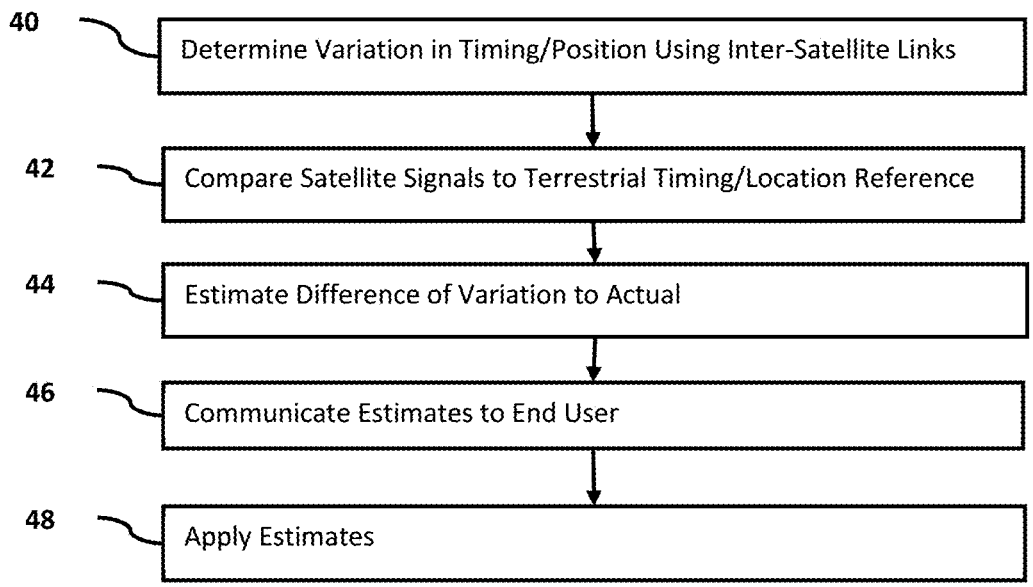
FIG. 4 is a flow chart diagram of another embodiment of a method for providing PNT data independent of GNSS.

FIG. 4 is a flow chart diagram of a method for providing PNT data independent of GPS or other purpose-built PNT systems. The timing corrections are determined using, in part, information from crosslinks and precision timing and provided to the user for correction.

The acts are performed in the order shown or a different order. Additional, different, or fewer acts may be provided. For example, act 48 is not performed.

In act 40, a processor determines, for a group of satellites, variations of each satellite's position and/or internal timing using inter-satellite links. The differences in position and/or timing from one satellite relative to another satellite are determined. For example, the variations in position are determined from ranging, and the variations of the internal timings are determined from receipt of timing information directly between the satellites. The relative position and/or timing between satellites is determined.

The satellites may determine the variation, such as using laser ranging. The variations are communicated to ground infrastructure. Alternatively, measurements or observations are communicated to the ground infrastructure, where a processor determines the variations from the measurement or observations.

In act 42, the processor compares signals from one or more of the satellites to a terrestrial timing reference at a known location. A ground station with access to precision timing compares the timing of the received PNT signals to the precision timing. The signals received at a ground monitoring station are compared to the terrestrial timing reference (e.g., the source of precision timing available to the terrestrial ground monitoring station). The comparison indicates an offset or difference in timing.

In act 44, the processor estimates, based on the comparison, a difference between (a) the variations of the satellite positions and/or internal timing and (b) actual earth-referenced positions based on the known location and/or the terrestrial timing reference. The information from the crosslinks and received PNT signals provides one set of locations and timing for the ground station. The known position and timing at the ground station may be different. The difference is calculated. Alternatively, the information is used to calculate orbits of the satellites, so the difference is based on satellite orbits. The difference between variations of the satellite positions and internal timing with the actual earth-referenced positions and the terrestrial timing reference, respectively, is found. These differences indicate a timing correction.

In act 46, the processor, via a transmitter for uplink and/or ground infrastructure, communicates the estimates to an end-user receiver of the PNT data. For example, the variations as timing corrections are communicated by distribution through a computer network or broadcast using the ground infrastructure. As another example, the variations are distributed by broadcast by at least one of the satellites. The variations as timing corrections for different satellites are communicated by those different satellites with the PNT signals for use by the end user equipment (i.e., end user receiver).

In one embodiment, the estimates of the differences are communicated as variations. The bias to the clock errors for the satellites is distributed either through the satellite constellation (via broadcast) or via a connection to the receiver itself to be applied.

In act 48, the end-user receiver applies the estimates. The timing and/or position corrections are used in determining position and/or timing from the PNT signals. By accounting for variation in time and/or location, more accurate timing and/or position of the end-user equipment is determined by the end-user equipment.

Figure 5:
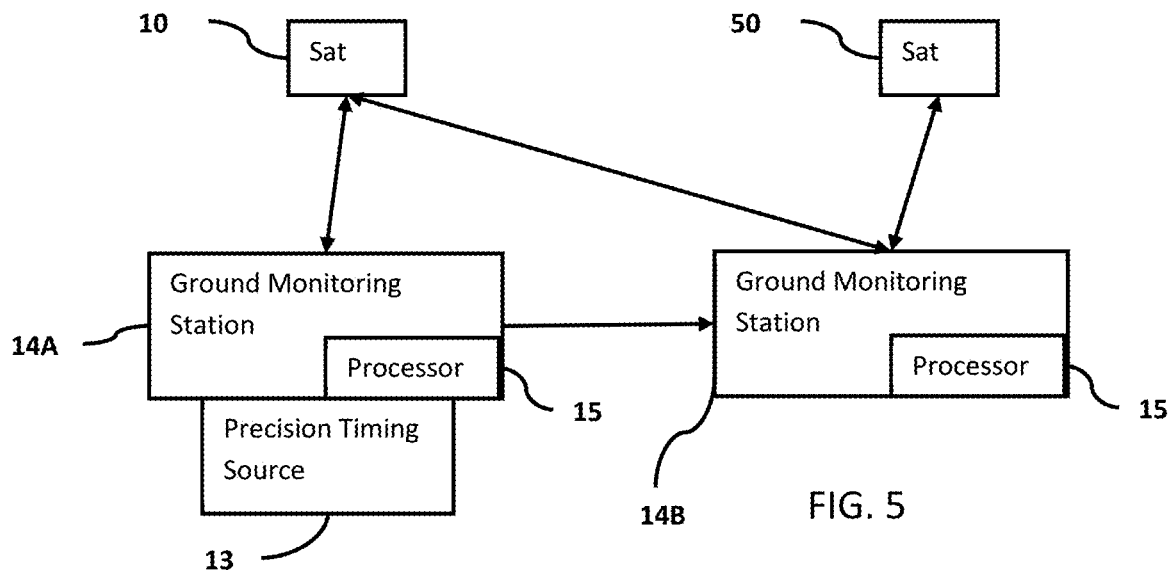

FIG. 5 shows an alternative embodiment of the satellite system. The timing corrections for different satellites are determined without using crosslinks, at least for some satellites. Precision timing is provided to anchor the timing for one or more satellites, but the timing corrections for other satellites 50 are based on propagation of the timing rather than crosslinks. The timing corrections are performed by adjusting the clock directly or by transmitting data about the errors in the unadjusted clock.

The satellites 10, 50 are configured to transmit PNT signals independent of a GPS or any other purpose-built PNT system. The clocks of the satellites 10, 50 may be out of phase or off by the same or different amounts from precision timing.

In one embodiment, the satellites 10, 50 are part of a same constellation, such as a constellation of LEO satellites. In other embodiments, one or more satellites 10, 50 have a MEO, GEO, or another orbit than LEO. In yet other embodiments, the satellites 10, 50 are part of different constellations.

While one ground monitoring station 10 is shown for each satellite 10, 50, any number of ground monitoring stations 14 and satellites 10, 50 may be used.

The ground monitoring stations 14 have known locations. The ground monitoring stations 14 are configured to receive the PNT signals from the satellites 10, 50. In one embodiment, one ground monitoring station 14A is not operable to receive PNT signals from one or more of the satellites 50, such as satellites 50 of a different constellation or satellites 50 below the horizon from the location of the ground monitoring station 14. Alternatively, the ground monitoring station 14A may receive the PNT signals from the satellite 50, but no crosslink data is provided.

Similarly, the source 13 of precision timing is available to one of the ground monitoring stations 14A and not to another of the ground monitoring stations 14B. As a result, at least some satellites 50 do not transmit and/or communicate with ground monitoring stations 14A having a source 13 of precision timing available. Some satellites 10 may be positioned so that the PNT signals from that satellite 10 are received by multiple ground monitoring stations 14A and B.

The ground monitoring stations 14A and B may be located within a region, such as a country or state. The timing may be propagated to a region and not the whole world. Accurate time is propagated to a region (not the whole world) based on where ground monitoring stations 14A and B are located, and where the ground monitoring stations 14A and B can see common satellites 10, 50 in view from time to time. Different precision timing may be propagated to different regions. Alternatively, the timing is propagated to the whole world or multiple regions.

The precision timing is provided by the source 13. The source 13 connects with at least one but not all the ground monitoring stations 14A. The source of precision timing is independent of GPS or any other purpose-built PNT system. For example, the source 13 is a source of worldwide standard of timing, a national standard of timing, a military standard of timing, or a corporate standard of timing.

The processors 15 are local to the ground monitoring stations 14A and B or may be remote, such as servers. The processor 15 of the ground monitoring station 14A receiving the precision timing is configured to estimate a variation of a clock of the satellite 10 from the precision timing. This variation is a timing correction. The timing correction is determined from the precision timing and the PNT signals. The timing of the ground monitoring station 14A may be synchronized with the precision timing. The ground monitoring station 14A receives the PNT signals from the satellite 10. The processor 15 determines the timing of receipt and the location from the PNT signals. By comparing to the known location and timing, the timing correction for the satellite 10 is determined. The correction that results in the location and timing matching is determined.

In one embodiment, the ground monitoring network server (GMNS) (processor 15) receives data from the master clock (source 13) and one or more of the ground monitoring stations 14A. Using that data, the GMNS calculates orbits and clock offsets for the satellites 10 in view of the ground monitoring station 14A. The clock offsets and orbits are transmitted from the ground monitoring station 14A to the satellites 10 to be included in the signal usable for PNT.

The processor 15 (e.g., GMNS) of the ground monitoring station 14B without the precision timing is configured to estimate the variation (timing correction) of the clock of the satellite 50 and the precision timing. Without direct access to the precision timing, the variation is based on the timing correction or variation for other satellites 10. The timing correction is propagated from one ground monitoring station 14A to another ground monitoring station 14B. The correction may be communicated using a computer network or land-based communications or may be through a satellite 10 in view of both ground monitoring stations 14. The propagation may be limited to a region.

The ground monitoring station 14B receives the PNT signals from the satellite 50 and the timing correction from the other ground monitoring station 14A. The processor 15 is configured to estimate the variation between the clock of the satellite 50 and the precision timing based on this information. The processor 15 is configured to estimate an accurate clock offset of a satellite 50 based on an accurate clock offset of the ground monitoring station 14A that is tracking the signal of that satellite 10. The processor 15 is configured to estimate an accurate clock offset of the ground monitoring station 14B based on an accurate clock offset of a satellite 10 that the ground monitoring station 14A is tracking. By using common satellites 10 to the different ground monitoring stations 14A and B and common ground monitoring stations 14A and B to different satellites 10, 50, the precision or accurate timing may be propagated through the region or constellation without inter-satellite links.

By determining the timing correction for satellite 10, the timing correction for ground monitoring station 14B may be determined from the timing correction for satellite 10, the PNT signals from satellite 10, and the known location for the ground monitoring station 14B. The corrected timing of the ground monitoring station 14B is used to determine the timing correction for satellite 50, propagating the precision timing. This process may be repeated for other ground monitoring stations 14 and satellites 50 to continue to propagate the timing correction based on precision timing.

The timing corrections for the satellites 10, 50 are transmitted to the satellites 10, 50. These timing corrections may be forwarded by broadcast from the satellites 10, 50 to the end-user equipment. Alternatively, or additionally, the timing corrections are transmitted to the end-user receiver (equipment) via ground or terrestrial communications. The end-user receiver receiving PNT signals from the satellite 50 receives the timing correction for the satellite 50. Similarly, the end-user receiver receiving PNT signals from the satellite 10 receives the timing correction for the satellite 10. The correction is applied in determining the timing and/or location from the PNT signals.

In one embodiment (e.g., FIG. 5), the clock variation from one satellite 10 is propagated for use in determining variation of a clock in another satellite 50. In other embodiments, the clock variation from the one satellite 10 is used to correct the clock of that satellite 10. An identification of error of the corrected clock, which error was applied to that clock is propagated. The variation of the clock in the other satellite 50 is found by comparing the PNT signals of both satellites 10, 50 using the propagated knowledge that the PNT signals from the one satellite 10 use the corrected clock. The indication provides this knowledge. The indication of error may be the knowledge of correction or may be actual error before or after correction and the time epoch of that error measurement. This propagates the precision timing through the satellites 50.

This propagation may be used for different constellations (see FIG. 2B). A first satellite system (constellation) includes a first satellite 10 configured to transmit PNT signals independent of a global positioning system or any other purpose-built PNT system. A second satellite system includes a second satellite 20 which is configured to transmit PNT signals which the receivers 12, 14 for the first satellite system may not ordinarily understand, such as due to use of different coding, modulation, frequency, and/or timing. The first and second satellites 10, 20 have first and second clocks, respectively. These clocks may not be accurate. A terrestrial source 13 of precision timing independent of the GPS or any other purpose-built PNT system is available to a first receiver 14 which receives signals from the first satellite 10 and measures the timing of those signals with respect to the precision timing. The first receiver 14 may be a ground command station, monitoring station, or other receiver. A first processor computes the variation of the first clock onboard the first satellite 10 based on its knowledge of the location of the first receiver 14, its knowledge of the orbital motions of the first satellite 10, and the measurements of the timing of the PNT signals from the first satellite 10 with respect to the precision timing.

In one implementation, the computed variations are communicated to other users of the first satellite system. In an alternative implementation, the computed variations are used to adjust the first clock of the first satellite 10 in a manner which reduces or minimizes or eliminates those variations.

A second receiver 21, 24 receives signals from the second satellite 20. A third receiver 21, 24 receives signals from the first satellite system. The second and third receivers 21, 24 share a common timing reference, which need not be a precise timing reference. The second and third receivers 24 may share hardware, such as being part of a same ground command or monitoring station. A second processor computes the variation of the second clock onboard the second satellite 20 based on its knowledge of the location of the second receiver 21, 24, its knowledge of the orbital motions of the second satellite 20, and the measurements of the timing of the PNT signals from the second satellite 20 with respect to the common timing reference. A third processor computes the variation of the shared timing reference with respect to the precision timing, based on its knowledge of the location of the first receiver 12, 14, its knowledge of the orbital motions of the first satellite 10, the measurements of the timing of the signals from the first satellite 10 with respect to the shared timing reference, and its knowledge of the variations of the first clock of the first satellite 10 with respect to the precision timing. The second processor then uses its previous computations (e.g., variation of the second clock of the second satellite 20 with respect to the common timing reference) as well as the variations of the shared timing reference computed by the third processor to compute the variations of the second clock of the second satellite 20 with respect to the precision timing. The second and third receivers 21, 24 may be separate hardware units or may be separate software or firmware modules running inside shared hardware. The end result is that the precision timing available to one constellation (e.g., the first constellation) may be used to adjust the clocks or determine clock error in satellites 20 of another constellation by using one or more receivers 21, 24 sharing a common timing reference and ability to receive signals from the different constellations.

Figure 6:
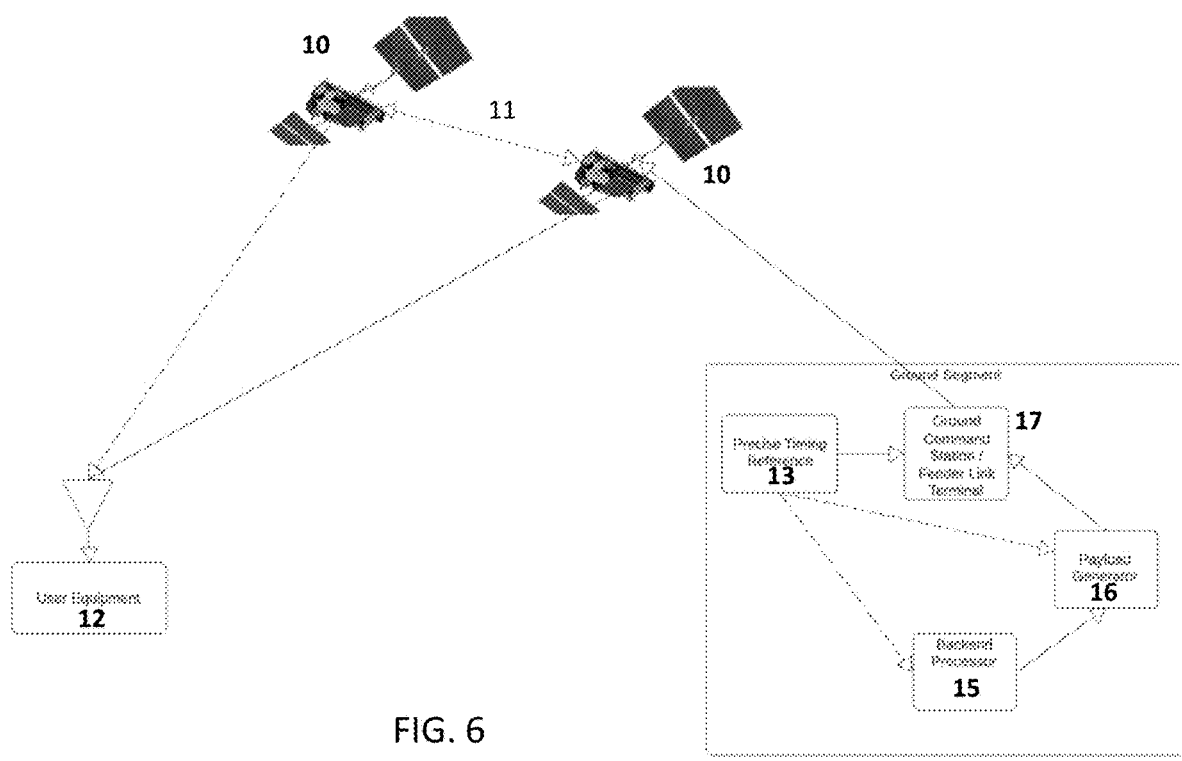
FIG. 6 illustrates another embodiment of a satellite system for providing PNT data independent of GNSS based on crosslinks.

FIG. 6 shows an alternate embodiment of the system. The transmitter 17 may be at a precisely known location and the timing of the signals transmitted by transmitter 17 may be directly controlled (e.g., synchronized) by the timing source 13 or using timing from the timing source 13. Since the signals transmitted by the transmitter 17 use timing from the precision timing source 13, satellite 10 may measure the timing of the signals it receives from transmitter 17 and directly calculate the satellite clock offset from those measurements and the known or calculated range to transmitter 17. The accurate clock or source 13 on the ground is used to calibrate the clocks of the satellite 10 using calculations performed by signal processors in the satellites 10 rather than relying on calculations performed by terrestrial processors.

Any number of satellites 10 from the same or different constellations may use this arrangement for timing correction. The links 11 are used so that a relative range and/or relative satellite timing is provided between the satellites 10. For each satellite 10 receiving the signals, the satellite 10 is configured to measure the timing of the signals as received with respect to the respective internal clock, is further configured to compute variation of its internal clock relative to the terrestrial source 13 of the precision timing taking into account motion of the satellite 10 relative to the known location of the ground station 14, and is configured to synchronize its internal clock with the terrestrial source 13 or measure and distribute the variations of its internal clock of the precision timing to at least another satellite 10 using the link 11.

In one embodiment, a group of satellites 10 each determines a variation of the satellite's 10 position and/or internal timing using the inter-satellite links 11. In one embodiment, the variations in position are determined from ranging and the variations in timing are determined from receipt of timing information from the links 11. Other ways may be used to determine the variation in position and/or timing. The internal timing of one or more of the satellites 10 are compared to signals synchronized to the terrestrial timing reference and transmitted from the known terrestrial location. Based on the comparing, a difference between (a) the variations of the satellite positions of the one or more of the satellites and/or the internal timing of the one or more of the satellites and (b) actual earth-referenced positions based on the known location and/or the terrestrial timing reference is estimated. This difference is communicated to the end-user receiver 12 of the PNT data. The communication may be through ground infrastructure and/or broadcast through or by one or more of the satellites 10. The end-user receiver 12 applies the differences to determine position, navigation, and/or timing.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A satellite system comprising:
    two or more satellites configured to transmit position, navigation, and time (PNT) signals independent of a global positioning system or any other purpose-built PNT system, the two or more satellites linked such that a relative range and/or satellite timing is provided between the two or more satellites, and the two or more satellites each having a clock, the two or more satellites all in a same orbital region;
    at least one ground monitoring station having a known location, the at least one ground monitoring station configured to receive the PNT signals of at least one of the two or more satellites;
    a terrestrial source of precision timing; and
    a processor configured to estimate, for each of the two or more satellites, a variation between the clock of the satellite and the precision timing source using the observations from the at least one ground monitoring station and the relative range and/or satellite timing without observations from any satellites outside of the same orbital region.

2. The system of claim 1 wherein the at least one ground monitoring station comprises a plurality of ground monitoring stations, at least one of the plurality configured to receive the precision timing.

3. The system of claim 1 wherein the at least one ground monitoring station or the processor is configured to estimate an orbit of each satellite of the two or more satellites.

4. The system of claim 1 wherein the two or more satellites are linked such that the relative satellite timing is provided from one of the two or more satellites to another of the two or more satellites.

5. The system of claim 1 wherein the two or more satellites are linked such that the relative range is observed between the two or more satellites.

6. The system of claim 1 wherein the two or more satellites have a low earth orbit.

7. The system of claim 6 wherein the two or more satellites comprise Iridium satellites.

8. The system of claim 1 wherein at least one satellite of the at least two satellites is in an orbit other than a low earth orbit.

9. The system of claim 1 wherein the at least two satellites comprise satellites from different satellite constellations.

10. The system of claim 9 wherein the processor is configured to obtain timing information from a first satellite constellation of the different satellite constellations for use in a second satellite constellation of the different satellite constellations.

11. The system of claim 10 wherein the processor is further configured to use the obtained timing information as a timing correction for timing of the second constellation.

12. The system of claim 1 wherein the terrestrial source of precision timing comprises a worldwide standard of timing, a national standard of timing, a military standard of timing, or a corporate standard of timing.

13. The system of claim 12 wherein the terrestrial source of precision timing comprises the national standard of timing from the National Institute of Standards and Technology (NIST) or the military standard of timing from the United States Naval Observatory (USNO).

14. The system of claim 1 further comprising a transmitter configured to transmit the variation for one or more of the clocks to the two or more satellites or to an end-user receiver.

15. The system of claim 1 wherein the processor is configured to incorporate the relative range and/or satellite timing and the observations from the ground monitoring station to estimate the variation of the clock of each of the at least two satellites.

16. The system of claim 1 wherein the terrestrial source of precision timing is independent of the global positioning system or any other purpose-built PNT system.

17. A satellite system comprising:
    first and second satellites configured to transmit position, navigation, and time (PNT) signals independent of a global positioning system or any other purpose-built PNT system, the first and second satellites having first and second clocks, respectively;
    first and second ground monitoring stations having known first and second locations, respectively, the first ground monitoring station operable to receive the PNT signals of the first satellite and not the second satellite;
    a terrestrial source of precision timing available to at least the first ground monitoring station;
    a first processor configured to estimate a first variation between the first clock of the first satellite and the precision timing, the first variation based on the precision timing, the first location, and the PNT signals; and
    a second processor configured to estimate a second variation between the second clock of the second satellite and the precision timing, the second variation is based on propagation of (1) the first variation communicated to the second ground monitoring station and the PNT signals of both satellites or (2) an indication of correction of the first clock based on the first variation.

18. The system of claim 17 wherein the first and second ground monitoring stations are within a region, and wherein the propagation is limited to the region.

19. The system of claim 17 wherein the second ground monitoring station is free of connection to receive the precision timing.

20. The system of claim 17 wherein the first and second satellites have a low earth orbit.

21. The system of claim 17 wherein the second satellite is in an orbit other than a low earth orbit.

22. The system of claim 17 wherein the first and second satellites comprise satellites from different satellite constellations.

23. The system of claim 17 wherein the terrestrial source of precision timing comprises a worldwide standard of timing, a national standard of timing, a military standard of timing, or a corporate standard of timing.

24. The system of claim 17 further comprising a transmitter configured to transmit the second variation to the second satellite or to an end-user receiver receiving the PNT signals from the second satellite.

25. The system of claim 17 wherein the terrestrial source of precision timing is independent of the global positioning system or any other purpose-built PNT system.

26. A satellite system comprising:
    first and second satellites configured to transmit position, navigation, and time (PNT) signals independent of a global positioning system (GPS) or any other purpose-built PNT system, the first and second satellites being linked such that a relative range and/or satellite timing is provided between the first and second satellites, the first and second satellites having first and second internal clocks, respectively;
    a terrestrial source of precision timing, the precision timing being independent of the GPS or any other purpose-built PNT system;

at least one ground station having a known location and configured to transmit signals to at least the first satellite, where the timing of the transmitted signals is synchronized with the precision timing;

wherein the first satellite receiving the signals is configured to measure the timing of the signals as received with respect to the first internal clock, is further configured to compute variation of the first internal clock relative to the terrestrial source of the precision timing taking into account motion of the first satellite relative to the known location of the ground station, and is configured to synchronize the first internal clock with the terrestrial source or measure and distribute the variations of the first internal clock of the precision timing to at least the second satellite using the link.

* * * * *